United States Patent [19]
Bonfilio

[11] Patent Number: 5,772,516
[45] Date of Patent: Jun. 30, 1998

[54] DAMPING DEVICE ADAPTED TO BE INTEGRATED INTO A MOTOR VEHICLE POWER UNIT

[76] Inventor: Ciriaco Bonfilio, 15 rue Castérés, 92110 Clichy (FR), France

[21] Appl. No.: 507,311

[22] PCT Filed: Dec. 19, 1994

[86] PCT No.: PCT/FR94/01483

§ 371 Date: Sep. 27, 1995

§ 102(e) Date: Sep. 27, 1995

[87] PCT Pub. No.: WO95/17615

PCT Pub. Date: Jul. 6, 1995

[30] Foreign Application Priority Data

Dec. 23, 1993 [FR] France ................... 93 15572

[51] Int. Cl.⁶ ........................................ F16D 3/14
[52] U.S. Cl. ........................ 464/68; 192/213.31
[58] Field of Search ................. 464/66, 68, 24, 464/100; 192/55.4, 55.61, 70.17, 208, 210.1, 213.12, 213.22, 213.31, 214.1; 74/574

[56] References Cited

U.S. PATENT DOCUMENTS

| | | | |
|---|---|---|---|
| 4,241,818 | 12/1980 | Miller | 192/54.4 X |
| 4,579,212 | 4/1986 | Kittel | 192/213.31 |
| 4,592,460 | 6/1986 | Kittel | 192/213.31 |
| 4,655,336 | 4/1987 | Casper et al. | 192/214.1 X |
| 4,890,712 | 1/1990 | Maucher et al. | 192/213.12 |
| 5,119,915 | 6/1992 | Nelson | 464/100 |
| 5,139,124 | 8/1992 | Friedmann | 464/68 X |
| 5,246,398 | 9/1993 | Birk et al. | 464/68 |
| 5,529,161 | 6/1996 | Ament et al. | 464/68 X |

FOREIGN PATENT DOCUMENTS

| | | |
|---|---|---|
| 0529669 | 3/1993 | European Pat. Off. . |
| 2554190 | 5/1985 | France . |
| 2587074 | 3/1987 | France . |
| 2688846 | 9/1993 | France . |
| 8503516 | 12/1992 | Germany . |
| 2180322 | 3/1987 | United Kingdom . |

Primary Examiner—Eileen A. Dunn
Attorney, Agent, or Firm—Longacre & White

[57] ABSTRACT

A damping device (10) of the type comprising damping member which are disposed between two coaxial rotating masses (12, 14), and of the type in which the damping member comprise a resilient damping mechanism (32) which is interposed between the two rotating masses (12, 14), a first friction damping mechanism (44) that includes a first annular friction surface (54) which is displaceable axially under the action of first resilient member, which urge it axially towards the first annular friction surface (54), and a second friction damping mechanism (46) which includes at least one further annular friction surface (66) displaceable axially under the action of second resilient member. The first and second resilient members are made in one piece (76), consisting of a ring (78) and a set of resiliently deformable radial fingers (80).

8 Claims, 3 Drawing Sheets

DAMPING DEVICE ADAPTED TO BE INTEGRATED INTO A MOTOR VEHICLE POWER UNIT

This application is entitled to the benefits of international application, PCT/FR94/01483, filed Dec. 19, 1994 as prescribed by 35 U.S.C. 371.

BACKGROUND OF THE INVENTION a) Field of the Invention

The present invention relates to a damping device of the type comprising damping means which are disposed between two coaxial rotating masses, the first of which is able to be coupled to the combustion engine of a motor vehicle power unit, the second being able to be coupled to the input shaft of a gearbox of the power unit.

b) Description of Related Art

The document GB-B-2 180 322 describes and illustrates one embodiment of such a damping device, in which the damping means comprise:

- a resilient damping mechanism interposed circumferentially between the two rotating masses so as to couple them together circumferentially;
- a first friction damping mechanism which comprises, firstly, a first annular friction surface coupled, in rotation and axially, to the second one of the two rotating masses, and, secondly, a second annular friction surface coupled in rotation to the second one of the two rotating masses, with respect to which it is displaceable axially under the action of first resilient means, which urge it axially towards the first annular friction surface, so as to grip axially an output disc that constitutes an output member of the resilient damping mechanism; and
- a second friction damping mechanism, constituting a torque limiter, which includes at least one third annular friction surface coupled in rotation to the first rotating mass, with respect to which it is displaceable axially under the action of second resilient means which urge it axially towards an annular support surface, which is formed in facing relationship therewith and which is part of the input component of the resilient damping mechanism.

In the embodiments proposed in the said document, each of the first and second resilient means acting on the various friction liners consists of a resilient annular ring, which bears on one or other of the two rotating masses and against a support ring which is associated with one of the facing friction liners.

That solution is particularly complicated to assemble, and expensive to manufacture, in that it necessitates the use of two independent components which are manufactured separately, as well as the provision of abutments on each of the masses, for engagement of the first and second resilient means respectively.

In addition, there is no functional connection between the two friction damping mechanisms that takes account of progressive wear in the various liners. These mechanisms are carried by the second mass and the first mass respectively.

SUMMARY OF THE INVENTION

An object of the present invention is to propose a novel design for a damping device which enables the drawbacks which have been described above to be overcome.

To that end, the invention proposes a damping device of the type described above, characterised in that the friction damping mechanisms are carried by the second mass, and in that the first and second resilient means are made as a single component which comprises a resilient ring and a set of resiliently deformable radial fingers, and which is interposed between the second rotating mass and the first annular friction surface and between the second rotating mass and the third annular friction surface.

Thanks to the invention, the number of components is reduced, and the solution is very compact in the axial direction, due to the fact that the resilient component in accordance with the invention provides a functional coupling between the two damping mechanisms. In addition, the radial fingers may be of substantial length, which enables the force exerted by the fingers to be closely controlled, and to be differentiated from that which is exerted by the resilient ring. Moreover, there is no need to provide an abutment on the first mass, which enables the latter to be simplified. Thus, with reference to the document GB-B-2 180 322, the shouldered circlip which is provided for engagement by the resilient means is eliminated.

In accordance with further features of the invention:

- the resilient ring is interposed between a first support surface formed on the second rotating mass and a second support surface formed on a support ring of a second friction liner, one annular surface of which constitutes the second annular friction surface;
- each of the two said support surfaces comprises an annular abutment rib;
- the first annular abutment rib is offset radially outwardly with respect to the second annular abutment rib;
- the third annular friction surface is offset radially with respect to the first and second annular friction surfaces, and the radial fingers are inclined and extend radially from one of the circular edges of the ring, in such a way that their free ends act on the third annular friction surface;
- the third annular friction surface is offset radially inwardly with respect to the first and second annular friction surfaces;
- the third annular friction surface comprises a first annular surface of a third friction liner which cooperates with an annular support surface defined on one surface of a support ring which is coupled in rotation and axially to the second rotating mass by means of a set of axial spacer bars, between which the radial fingers lie;
- the second annular surface of the third friction liner cooperates with an intermediate engagement ring which is coupled in rotation to the second rotating mass, with respect to which it is displaceable axially, and on which the free ends of the radial fingers act;
- the intermediate engagement ring is driven in rotation by the spacer bars;
- the first annular friction surface is an annular surface of a first friction liner, carried by the said surface of the support ring with which the third friction liner cooperates.

It will be appreciated that the first rib may be made inexpensively by moulding, that the position of the third annular friction surface enables axial size to be reduced, and that the support ring that is fixed to the spacer bars constitutes a component which is common to both friction damping mechanisms, in a simple and inexpensive way. Thus there is no need to machine either the second mass or the first mass.

BRIEF DESCRIPTION OF THE DRAWING

Further features and advantages of the invention will appear more clearly from a reading of the detailed description that follows, for an understanding of which reference will be made to the attached drawings, in which.

DETAILED DESCRIPTION OF THE INVENTION

Figure 1:
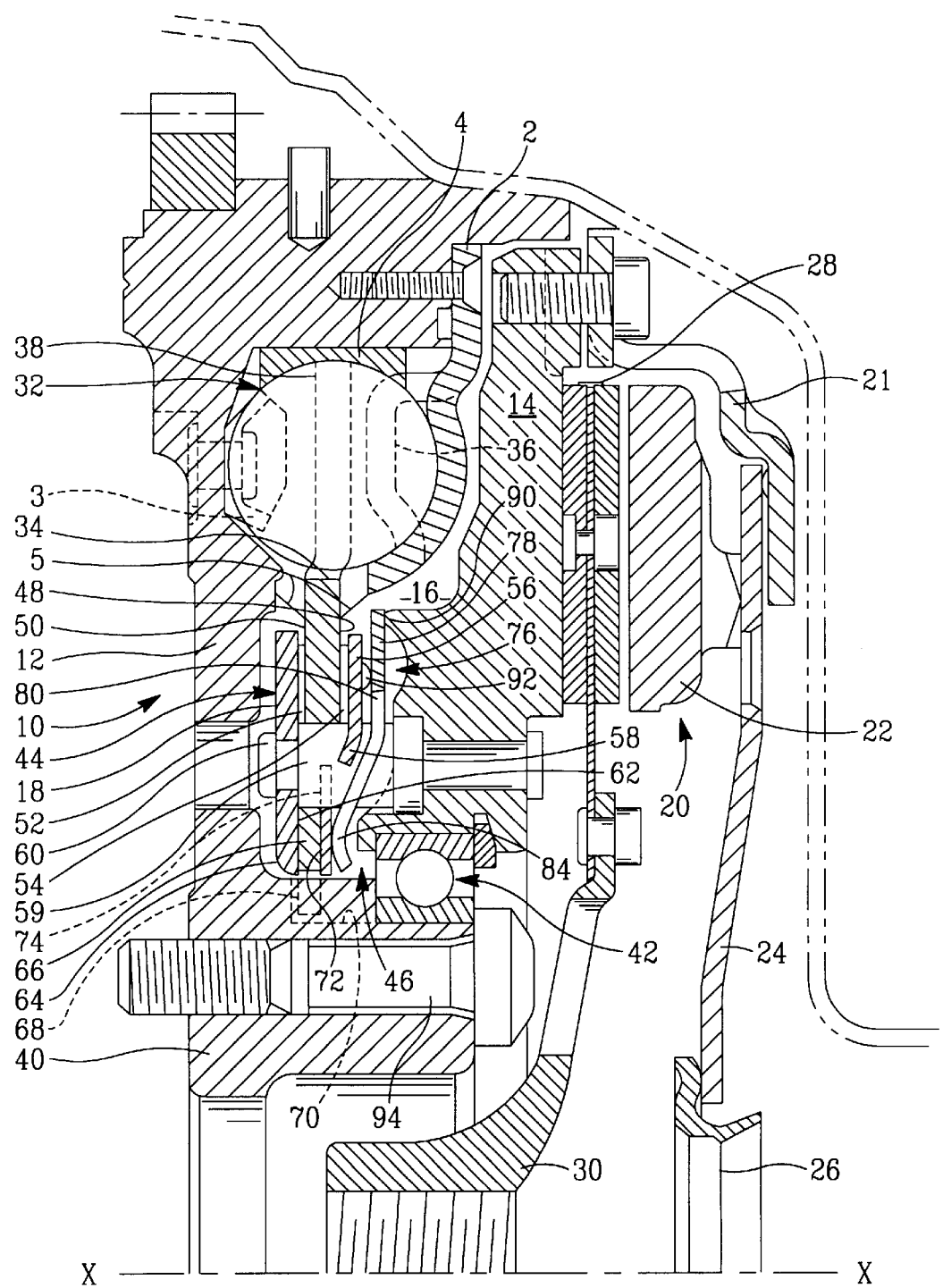
FIG. 1 is a half view in axial cross section of a first embodiment of a damping device in accordance with the invention, incorporated within a motor vehicle friction clutch.

FIG. 1 shows a damping device 10 in the form of a damped flywheel for a motor vehicle, commonly referred to as a double damped flywheel, which consists essentially of a first rotating mass 12 having the general form of a plate, and a coaxial second rotating mass 14 in the form of a plate, which extend parallel to each other, and which delimit between them an intermediate housing comprising an annular outer portion 16 and a portion 18 which lies radially inwards towards the axis of rotation X—X.

The second rotating mass 14 constitutes the reaction plate of a friction clutch mechanism 20, shown diagrammatically and comprising a cover plate 21, a pressure plate 22, and a diaphragm 24 which is arranged to be actuated by a component 26 of a clutch release bearing (not shown).

The friction clutch 20 also includes a friction disc 28 coupled to a central hub 30, which is mounted on the input shaft of the gearbox for rotation with it. In the known way, the clutch is normally engaged, and the diaphragm 24 bears on the cover plate 21 which is fixed to the reaction plate 14, so as to urge the pressure plate 22 towards the plate 14 and so grip friction liners, which are included in the disc 28, between the said plates 14, 22. In order to disengage the clutch a force is exerted, in this example in traction by means of the component 26, on the ends of the fingers of the diaphragm 24, so as to cause it to cease acting on the pressure plate 22. It will be recalled that the pressure plate 22 is coupled in rotation to the cover plate 21 with axial mobility, usually through tangential tongues (not shown).

In a known design, the damping means of the damped flywheel 10 comprise a resilient damping mechanism 32 that consists of a set of helical springs 32 (shown diagrammatically), which constitute force accumulating elements and which are interposed circunmferentially between engagement elements 36 which are coupled in rotation to the first rotating mass 12, and an output member consisting of an annular output disc 34, the outer peripheral edge of which has a set of external radial lugs 38 which are arranged to cooperate with the corresponding circumferential ends of the springs 32.

The purpose of the damping mechanism 32, within the limits of a relative angular displacement between the disc 34 and the first mass 12, is to couple the disc 34 resiliently to the said mass 12 in order, in combination with damping mechanisms 44, 46 to be described later herein, to absorb the vibrations that arise along the whole length of the drive train which extends from the engine of the vehicle to the road wheel axles.

The first rotating mass 12 also includes, integrally in the present case, a central hub 40 which is arranged to be secured to the end of a crankshaft (not shown) of a combustion engine, in this example by means of studs 94, and which carries the second rotating mass 14 for rotation thereon through a rolling bearing 42. At its outer periphery, the plate 12 carries an integral, annular, axially oriented skirt portion, to the free end of which there is fixed, in this example by means of threaded fasteners, a metallic component 2 which is press-formed locally to form the engagement elements 36.

The first mass 12 thus constitutes the input element of the resilient damping mechanism 32.

The plate 12 also carries members 3, which in this example are secured by riveting to the plate 12 so as to constitute further engagement elements 36. Pads 4 are hooked on to the turns of the springs 32, being interposed radially between the inner periphery of the skirt portion of the plate 12 and the springs 32, so as to reduce wear. The plate 12, with the member 2, defines a cavity within which are accommodated the springs 32 with their pads 4, and into which the lugs 38 of the disc 34 penetrate. This cavity is partially filled with grease for lubricating the springs 32, and is closed so that its interior is sealed, by means of sealing rings 5 which are fitted on either side of the disc 34 so as to work between the said disc 34 and, respectively, the plate 12 and the member 2.

It will be noted that the members 2, 3, and consequently the mass 12, constitute the input member of the mechanism 32.

The damping device 10 further includes a first friction damping mechanism 44, which is arranged radially towards the inside, close to the resilient damping mechanism 32 (inwardly of the springs 32), together with a second friction damping mechanism 46 which is arranged radially even further inwardly, close to the cylindrical peripheral surface of the hub 40. In accordance with the invention, the friction damping mechanisms 44, 46 are carried by the second mass.

The first friction damping mechanism 44 comprises the output disc 34, the opposed radial faces 48 and 50 of which are received between a friction liner 54 and an annular friction liner 52, respectively.

The annular friction liner 54 is carried by, and fixed to, a liner support ring 56 which has internal radial lugs 58, which are received between axial spacer bars 60 that are coupled in rotation, and fixed axially, to the second rotating mass comprising the reaction plate 14 of the clutch mechanism 20. In this example, the liner 54 is adhesively bonded on the ring 56, and the lugs 58 are inclined towards the mass 12.

The annular friction liner 54 is thus coupled in rotation, through the support ring 56 and the spacer bars 60, to the second rotating mass 14, though it can be displaced axially with reference to this latter.

The annular friction liner 52 is fixed on a surface 62, in facing relationship with it, of a support ring 64 which is fixed on the ends of the spacer bars 60, so as to be coupled in rotation to the second rotating mass 14 and to be coupled axially to the latter. In this example, the liner 54 is adhesively bonded on to the ring 64.

The friction liner 52 thus constitutes a reaction liner, against which the surface 50 of the output disc 34 is engaged when the friction liner 54 is urged axially towards the surface 48 of the disc 34 by axially acting resilient means, which will be described below.

The second friction damping mechanism 46 includes a third annular friction liner 66, which is made in the form of a ring of friction material having internal radial lugs 68 which cooperate with axial slots 70 formed in the cylindrical peripheral surface of the hub 40, in such a way that the third friction liner 66 is coupled in rotation to the first rotating mass 12 in mating cooperation, and is able to be displaced axially with respect to the latter. A circumferential clearance may optionally be provided between the lugs 68 and the slots 70.

The third friction liner 66 is arranged to cooperate with an annular support surface portion formed, in facing relationship with it, on the surface 62 of the support ring 64, and also with an annular surface portion, in facing relationship with it, of an intermediate engagement ring 72 having external radial lugs 74, which are received between the spacer bars 60 in such a way that the intermediate engagement ring 72 is coupled in rotation to the second rotating mass 14 by means of the spacer bars 60, but is able to be displaced axially with respect to this latter and with respect to the spacer bars 60, in order to clamp the third friction liner 66 between the support surface 62 and the facing surface of the ring 72 under the action of the resilient means 76, which will now be described. In this example the liner 66 is secured by adhesive bonding on the ring 72, and lies radially inwards of the spacer bars 60.

Figure 2:
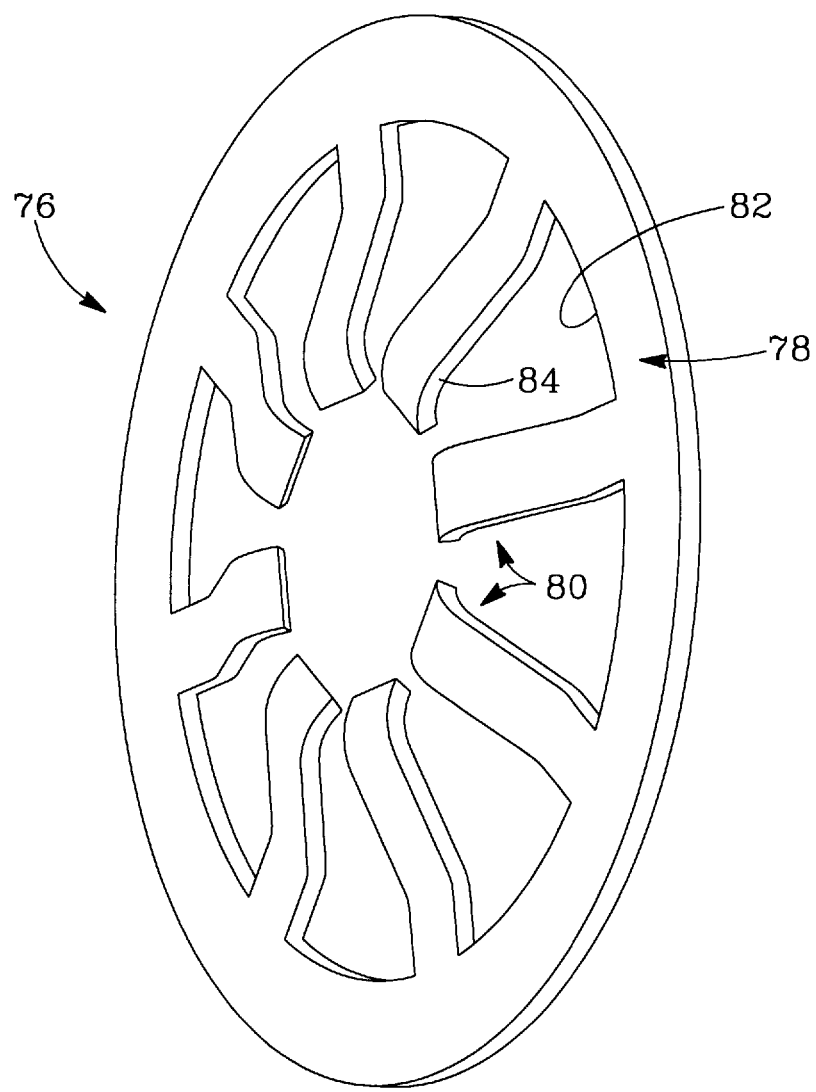
FIG. 2 is a perspective view, on a larger scale, of the single component that constitutes the resilient means of the first and second friction damping mechanisms.

In accordance with the invention, the resilient means 76, acting on the friction liner 54 and on the third friction liner 66, through, respectively, the support ring 56 and the intermediate engagement ring 72, consist of a single element made in one piece 76 of pressformed and curved sheet metal, which is shown in detail in FIG. 2.

The one-piece elastic element 76 comprises an outer radial portion in the form of a Belleville ring 78, and a set of resiliently deformable radial fingers 80. The resilient ring 78 accordingly has a frustoconical profile in the free state. The element 76 is preferably heat treated (by heating followed by quenching) after having been formed to shape, in order to give it the desired elasticity and to reduce wear.

The fingers 80 extend radially from the inner circular edge 82 of the ring 78, and are spaced apart at regular intervals so as to extend between the spacer bars 60 without interfering with these latter. The fingers 80 are inclined, which enables the rolling bearing 42 to be embraced, and which makes the best use of the available space in combination with the inclined lugs 58.

The free end portion 84 of the radial fingers 80 is a curved portion that defines a convex engagement surface 86, which is arranged to cooperate with the annular surface corresponding to the facing surface of the intermediate engagement ring 72, as is shown in FIG. 1.

A first face of the ring 78 is in axial engagement against an annular abutment rib 90, formed, in facing relationship with it, on the second rotating mass 14, while the other face 76 of the ring 78 is in axial abutment against a rib 92 formed, in facing relationship with it, on the corresponding face of the ring 56 that supports the friction liner 54. The ribs 90, 92 are rounded for this purpose so as to give point contact.

The first rib 90 is offset radially outwardly with respect to the annular rib 92, so that the single elastic element 76 is able to urge the friction liner 54 axially towards the left with reference to FIG. 1, by virtue of a lever action of the radial fingers, the free ends 84 of which have their reaction point against the corresponding face of the intermediate engagement ring 72.

Thus the ring 76 bears at its inner periphery on the rib 90, which is inexpensively formed by moulding with the plate 14, and at its outer periphery on the rib 92, which is inexpensively obtained by pressforming the ring 56, which in this example is of metal. It is also possible to exercise close control of the load exerted by the ring 76 on the ring 56.

Fitting of the single elastic ring 76 is particularly simple, because it is automatically centred and finds its various points of engagement during final assembly of the damping device 10 with the studs 94. It will be noted that the spacer bars 60, by cooperating with the fingers 80, prevent rotation of the element 76.

Apart from the simple nature of its manufacture and fitting, it can be seen that the single elastic element 76 provides an operative connection between the two friction damping systems 44 and 46 according to the progressive wear in the various friction liners 52, 54 and 56. It will be noted that the assembly of the components 54, 56, 34, 52, 64 constitutes a torque limiter carried by the second mass 14 radially inwardly of the springs 32, with the disc 34 being freely mounted in rotation with respect to the spacer bars 60.

Thanks to the invention, it is possible to omit the friction device which, in the document GB-B-2 180 322, works between the plate of the first mass and the disc which is fixed to the second mass. In this way, it is possible to increase the amount of friction within a given axial size.

Figure 3:
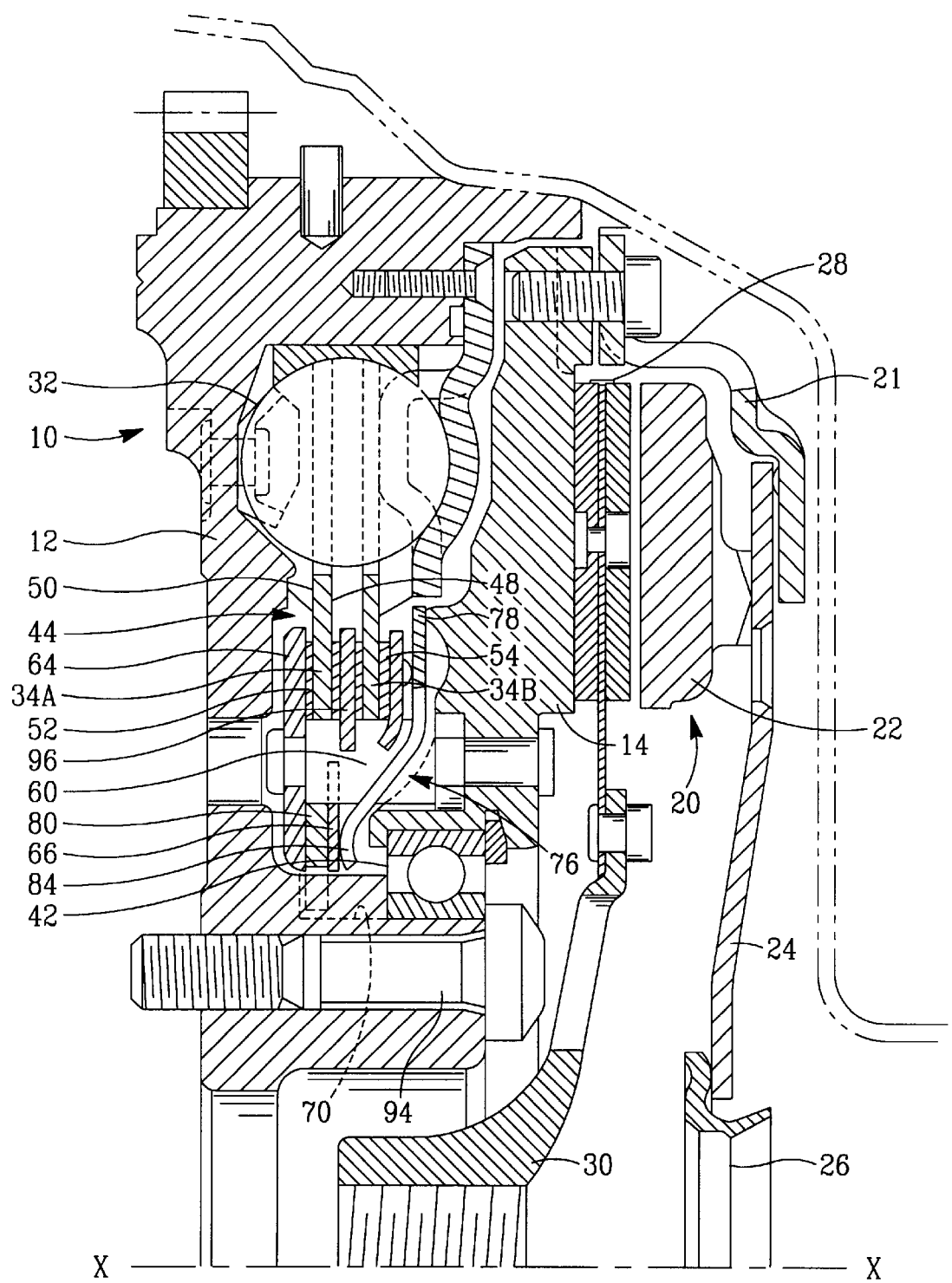
FIG. 3 is a view similar to that in FIG. 1, showing a modified form of the first friction damping mechanism.

Thus, in the modified embodiment shown in FIG. 3, the first friction damping mechanism 44 is a double mechanism which employs an intermediate element 96 which carries two friction liners, and which is mounted for axial movement on the spacer bars 60, so as to be received between the opposed surfaces of two parallel output discs 34A and 34B, the opposed surfaces 48 and 50 of which cooperate, as in the case of the first embodiment, with a first friction liner 54 and with a second friction liner 52, respectively.

The design of the single resilient element 76 is similar to that described with reference to the first embodiment shown in FIG. 1, with the profile of the radial fingers 80 being more sharply inclined so as better to extend around the rolling bearing 42.

It is of course possible to reverse the structures, and thus, in FIG. 1, the liners 52 and 54 may be fixed on the disc 34, and the liner 66 on the ring 64. As will have been understood, and as will appear from the drawings, the axial load exerted by the Belleville ring 78 is greater than the axial load exerted by the elastic fingers 80, this being the desired result. It is possible to make the fingers 80 more flexible, for example with the aid of holes formed in these latter. All this depend s on the application.

The rotation of the discs 34, 34A, 34B can of course be limited, with these latter then meshing with a clearance with the spacer bars, by contrast with the examples shown in FIGS. 1 and 3.

The presence of the friction rings, especially as regards the torque limiter, is not obligatory, and the disc 34 may be gripped in FIG. 1 directly between the rings 56, 64 which accordingly offer annular friction surfaces to the disc 34.

Thus, th e rings 56, 64, 72 may, by virtue of their appropriate surfaces, directly constitute the annular friction surfaces.

It will be recalled that during the relative angular displacement between the masses 12, 14, the springs 32 are compressed between, firstly, the components 2, 3 and thus the mass 12 constituting the input component of the resilient damping mechanism 32, and, secondly, the disc 34 or the disc 34A, 34B constituting the output component of the said mechanism 32.

During this phase, friction, determined by the inclined fingers 80, is set up between the liner 66 (or the ring 72) and the ring 64. When the transmitted torque exceeds a value which is predetermined by the load of the Belleville ring 76, sliding occurs with the onset of friction between the liners 52, 54 (or the rings 64, 56) and the discs 34, 34A, 34B. In FIG. 3, friction has of course taken place between the friction liners of the element 96 and the discs 34A, 34B.

I claim:

1. A damping device (10) comprising damping means which are disposed between two coaxial rotating masses (12, 14), the first one (12) of the two masses is adapted to be coupled to the combustion engine of a motor vehicle power unit, and the second one (14) of the two masses is adapted to be connected to the input shaft of a gearbox of the power unit, in which the damping means comprise:

a resilient damping mechanism (32) interposed circumferentially between the two rotating masses (12, 14) so as to couple them together circumferentially, and comprising at least an output disc (32, 32A, 32B);

a first friction damping mechanism (44) which comprises, firstly, a first annular friction element (52) coupled, in rotation and axially, to the second one (14) of the two rotating masses, and secondly a second annular friction element (54) coupled in rotation to the second one (14) of the two rotating masses, with respect to which the second friction element is displaceable axially under the action of first resilient means (78), which urge the second friction element axially towards the first annular friction element (52), so as to grip axially at least one output disc (34, 34A, 34B) of the resilient damping mechanism (32); and a second friction damping mechanism (46) which includes at least one third annular friction element (66) coupled in rotation to one of the first and second rotating masses (12, 14) and displaceable axially with respect to said one of the two rotating masses under the action of second resilient means (80) which urge the third annular friction element axially towards an annular support surface (62), which is formed in facing relationship therewith and which is coupled in rotation to one of the first and second rotating masses (12, 14), wherein the first and second friction damping mechanisms (44, 46) are carried by the second mass (14), and in that the first and second resilient means are made as a single component (76) which comprises a resilient ring (78) forming the first resilient means and a set of resiliently deformable radial fingers (80) forming the second resilient means, and which is interposed between the second rotating mass (14) and the second annular friction element (54) and between the second rotating mass (14) and the third annular friction element (66), wherein the third annular friction element (66) is offset radially inwardly with respect to the first and second annular friction elements, and in that the radial fingers (80) are inclined and extend radially from one of the circular edges (82) of the ring (78), in such a way that free ends (84, 86) of the radial fingers (80) act on the third annular friction element (66).

2. A damping device according to claim 1, characterised in that the resilient ring (78) is interposed between a first support surface (90) formed on the second rotating mass (14) and a second support surface (92) formed on a support ring (56) of a second friction liner (54), one annular surface of which constitutes the second annular friction element.

3. A damping device according to claim 2, characterised in that each of the said support surfaces comprises at least one annular abutment rib (90, 92).

4. A damping device according to claim 3, characterised in that the first annular abutment rib (90) is offset radially outwardly with respect to the second annular abutment rib (92).

5. A damping device according to claim 1, characterised in that the third annular friction element comprises a first annular surface of a third friction liner (66) which cooperates with the annular support surface defined on one surface (62) of a support ring (64), which is coupled in rotation and axially to the second rotating mass (14) by means of a set of axial spacer bars (60), between which the radial fingers (80) lie.

6. A damping device according to claim 5, characterised in that the first annular friction element (52) comprises an annular surface of a first friction liner, carried by the surface (62) of the support ring (64) with which the third friction liner (66) cooperates.

7. A damping device according to claim 5, characterised in that the second annular surface of the third friction liner (66) cooperates with an intermediate engagement ring (72) which is coupled in rotation to the second rotating mass, with respect to which it is displaceable axially, and on which the free ends (84, 86) of the radial fingers (80) act.

8. A damping device according to claim 7, characterised in that the intermediate engagement ring (72) is driven in rotation by the spacer bars (60).

* * * * *